US007658237B2

(12) United States Patent
Rudolf et al.

(10) Patent No.: US 7,658,237 B2
(45) Date of Patent: Feb. 9, 2010

(54) POWER TOOL HAVING MODE CONTROLLER

(75) Inventors: Boris Rudolf, Stuttgart (DE); Martin Beichter, Stuttgart (DE); Christof Kress, Deizisau (DE)

(73) Assignee: C. & E. Fein GmbH (DE)

( * ) Notice: Subject to any disclaimer, the term of this patent is extended or adjusted under 35 U.S.C. 154(b) by 661 days.

(21) Appl. No.: 11/016,786

(22) Filed: Dec. 20, 2004

(65) Prior Publication Data

US 2005/0136814 A1 Jun. 23, 2005

(30) Foreign Application Priority Data

Dec. 20, 2003 (DE) ................................ 103 60 165

(51) Int. Cl.
*B23Q 5/12* (2006.01)

(52) U.S. Cl. ............................................ 173/11; 173/2

(58) Field of Classification Search ..................... 173/2, 173/11

See application file for complete search history.

(56) References Cited

U.S. PATENT DOCUMENTS

| | | | | |
|---|---|---|---|---|
| 5,657,417 | A * | 8/1997 | Di Troia | 388/829 |
| 6,598,684 | B2 * | 7/2003 | Watanabe | 173/2 |
| 6,687,567 | B2 * | 2/2004 | Watanabe | 700/168 |
| 2003/0034164 | A1 | 2/2003 | Rudolf et al. | |
| 2003/0196824 | A1 | 10/2003 | Gass et al. | |

FOREIGN PATENT DOCUMENTS

| | | | |
|---|---|---|---|
| DE | 39 16 355 | | 12/1989 |
| DE | 40 27 135 | | 3/1992 |
| DE | 94 04 382.5 | | 6/1994 |
| DE | 19507955 | A1 | 9/1996 |
| DE | 196 45 907 | | 11/1996 |
| DE | 196 17 882 | | 11/1997 |
| DE | 19617882 | A1 | 11/1997 |
| DE | 197 05 818 | | 8/1998 |
| DE | 101 41 161 | | 2/2003 |
| DE | 102 03 614 | | 7/2003 |
| EP | 0 352 397 | | 1/1993 |
| FR | 2613270 | A1 | 10/1988 |
| WO | WO 03/006175 | | 1/2003 |
| WO | WO 03/061913 | A1 | 1/2003 |

OTHER PUBLICATIONS

European Search Report—Feb. 17, 2005.
International Search Report; Mar. 16, 2006; 4 pages.

* cited by examiner

*Primary Examiner*—Rinaldi I Rada
*Assistant Examiner*—Gloria R Weeks
(74) *Attorney, Agent, or Firm*—St. Onge Steward Johnston & Reens LLC

(57) ABSTRACT

The invention discloses a power tool having a motor adapted to drive a tool, comprising at least one switching element, coupled with a controller, for actuation of the motor, the controller being configured so that the motor can be switched on for driving the tool only when the at least one switching element is activated several times in a predetermined way, or when at least two switching elements are activated simultaneously or in a predetermined way in succession, there being provided at least three operating modes, namely an inoperative mode, in which the motor is out of operation, a working mode in which the motor is driven for driving the tool, and an intermediate mode, in which the user is signaled that further activation of a switching element is needed for transferring the motor to its working mode.

29 Claims, 1 Drawing Sheet

POWER TOOL HAVING MODE CONTROLLER

This application claims priority from pending German Patent Application No. 103 60 165.1 filed on Dec. 20, 2003.

FIELD OF THE INVENTION

The present invention relates to a power tool having a motor adapted to drive a tool, comprising at least one switching element, coupled with a controller, for actuation of the motor.

The invention further relates to a method for controlling a power tool of that kind.

It is known from copending U.S. patent application Ser. No. 10/214,844 (US 2003/0034164 A1) which is fully incorporated herein by reference that optical switches can be used for controlling power tools. Such arrangements permit a plurality of optical switches in miniaturized form, operating essentially in the way of a light barrier, to be arranged at a plurality of positions on the power tool, without there being a need to take special measures as guard to prevent accidental contact. As both activation and evaluation of the switching signals are effected via light pipes, the switching elements can be arranged at almost any desired position of the power tool without the need to take special measures as protection against the system voltage. It is, thus, possible to provide power tools that are clearly improved ergonomically, by the use of a plurality of switching elements actuated, preferably, via resilient, elastic touch areas. It may be provided in this case that for switching on the motor at least two switching elements need to be actuated simultaneously.

There is, however, always a risk that the power tool may be actuated accidentally, as different switching elements can be activated easily via elastic touch areas and as such activation of individual switching elements may not be readily noticeable.

SUMMARY OF THE INVENTION

It is a first object of the present invention to disclose a power tool that provides for a high degree of operating safety.

It is a second object of the invention to disclose a power tool that is protected against incidental power-on of the motor.

It is a second object of the invention to disclose a power tool that can easily be controlled by switches using soft keys.

It is still another object the invention to provide a control for a power tool having different control modes that are indicated to a user of the tool.

These and other objects of the invention are achieved by a power tool having a motor adapted to drive a tool, comprising at least one switching element, coupled with a controller, for actuation of the motor, the controller being designed so that the motor can be switched on for driving the tool only when the at least one switching element is activated several times in a predetermined way, or when at least two switching elements are activated simultaneously or in a predetermined way in succession, there being provided at least three operating modes, namely an inoperative mode, in which the motor is out of operation, a working mode in which the motor is driven for driving a tool, and an intermediate mode, in which the user is signaled that further activation of a switching element is needed for transferring the motor to its working mode.

The object of the invention is further achieved by a method for controlling a power tool that comprises at least three operating modes, namely an inoperative mode, in which the motor is out of operation, a working mode in which the motor is driven for driving a tool, and an intermediate mode, the motor being controlled in such a way that for transferring the motor from the inoperative mode to the working mode a switching element needs to be activated several times in succession, in a predetermined way, or several switching elements need to be activated simultaneously or in succession in a predetermined way, the first activation of a switching element having the effect to transfer the power tool to the intermediate mode and to signal to the user that the tool is in that intermediate mode before the tool can be transferred to the working mode by further activation of a switching element in the predetermined way, or can be transferred to the inoperative mode by deactivation of the switching element actuated first.

The object of the invention is thus perfectly achieved.

This is so because intentional switching-on of the power tool is sort of enforced in that for causing the motor to operate in the working mode it is necessary that at least two switching elements be actuated in a predetermined way or one switching element be actuated several times in succession in a predetermined way. Further, an intermediate mode is provided in addition to the inoperative mode and the working mode, in which the user is signaled that additional activation of a switching element is required for transferring the power tool to its working mode. If, for example, a switching element is activated accidentally, for example when the machine is still connected to voltage and is put down in that mode, then the user is warned directly that the tool can be transferred to its working mode by additional activation of one switching element. Similarly, if the machine is handed on by one user to the next, or if a child should touch the power tool thereby accidentally activating a switching element, then the risk, existing in the intermediate mode, that any further activation of a switching element may cause the machine to start running will be made noticeable immediately.

This clearly reduces the hazard potential of the tool.

For signaling to the user that the power tool is in its intermediate mode it is in principle possible to make use of all imaginable suitable kinds of signaling means. For example, the power tool may be provided with a buzzer or a beeper for signaling the intermediate mode. Further, optical signaling means, such as LEDs or the like, may be used to indicate the intermediate mode. Likewise, haptic signaling means, i.e. signaling means that are perceivable by the user's sense of touch, are especially well suited for indicating the intermediate mode. For example, the user could be informed of the intermediate mode by vibration.

According to a further development of the invention, the design of the control means is such that the motor will be supplied with periodic voltage pulses of short duration in the intermediate mode in order to signal to the user by short motion impulses of the tool that the tool is in its intermediate mode.

This means that in its intermediate mode the motor will be activated for short intervals so that the tool and/or the drive shaft of the tool will move shortly without, however, performing a working movement. This mode, which may be paraphrased also as "tuckering", is clearly perceivable due to the short-time pulses of the motor, and is at the same time noticeable optically and acoustically.

This is, therefore, an especially effective way of indicating to the user that the tool is in its intermediate mode. Additional signaling means, such as optical or acoustic signaling means, are not needed for this purpose.

In a further embodiment of the invention, the design of the controller is such that for switching on the tool at least one or more switching elements must be actuated several times within a predetermined timeframe.

This likewise improves the operating safety of the tool. By defining a given timeframe within which a single or a plurality of switching elements must be activated several times, the risk that the motor may be switched on unintentionally is reduced still further as at the end of a given time, for example after a few seconds, even additional activation of a switching element will not cause the tool to be transferred to its working mode. Instead, it is then necessary for this purpose to initially deactivate all switching elements and to then activate them once more.

According to a further embodiment of the invention, the design of the control means is such that when the motor is not transferred to its working mode by activation of a switching element in the predetermined way within a given timeframe, it is automatically transferred from its intermediate mode to its inoperative mode.

This improves the operating safety still further as the motor, in its intermediate mode, is automatically transferred back to its inoperative mode if no activation occurs that would transfer it to the working mode.

In an advantageous further development of the invention, the switching elements take the form of pushbuttons.

In an additional further development of the invention, the switching elements take the form of optical switches or of micro switches that can be activated via elastic touch areas.

This permits the switching elements to be miniaturized and to be arranged in those positions of the power tool that are especially well suited under ergonomic aspects.

In an additional further improvement of the invention, the switching elements can be activated by the act of grasping the housing of the power tool or of a handle of the power tool.

This permits an especially ergonomic design of the power tool.

In a preferred further development of the invention, the design of the control means is such that activation of two switching elements in short succession will directly transfer the motor from its inoperative mode to its working mode. Preferably, it is necessary for this purpose to actuate a front and a rear touch area.

This permits the motor to be started quickly when it is being switched on purposefully.

It is understood that the features of the invention mentioned above and those yet to be explained below can be used not only in the respective combinations indicated, but also in other combinations or in isolation, without leaving the scope of the present invention.

BRIEF DESCRIPTION OF THE DRAWINGS

Other features and advantages of the invention will become apparent from certain preferred embodiments of the invention which will be described hereafter with reference to the drawings which are of merely exemplary nature without limiting the scope of the invention and in which.

DETAILED DESCRIPTION OF THE PREFERRED EMBODIMENTS

Figures 1, 2:
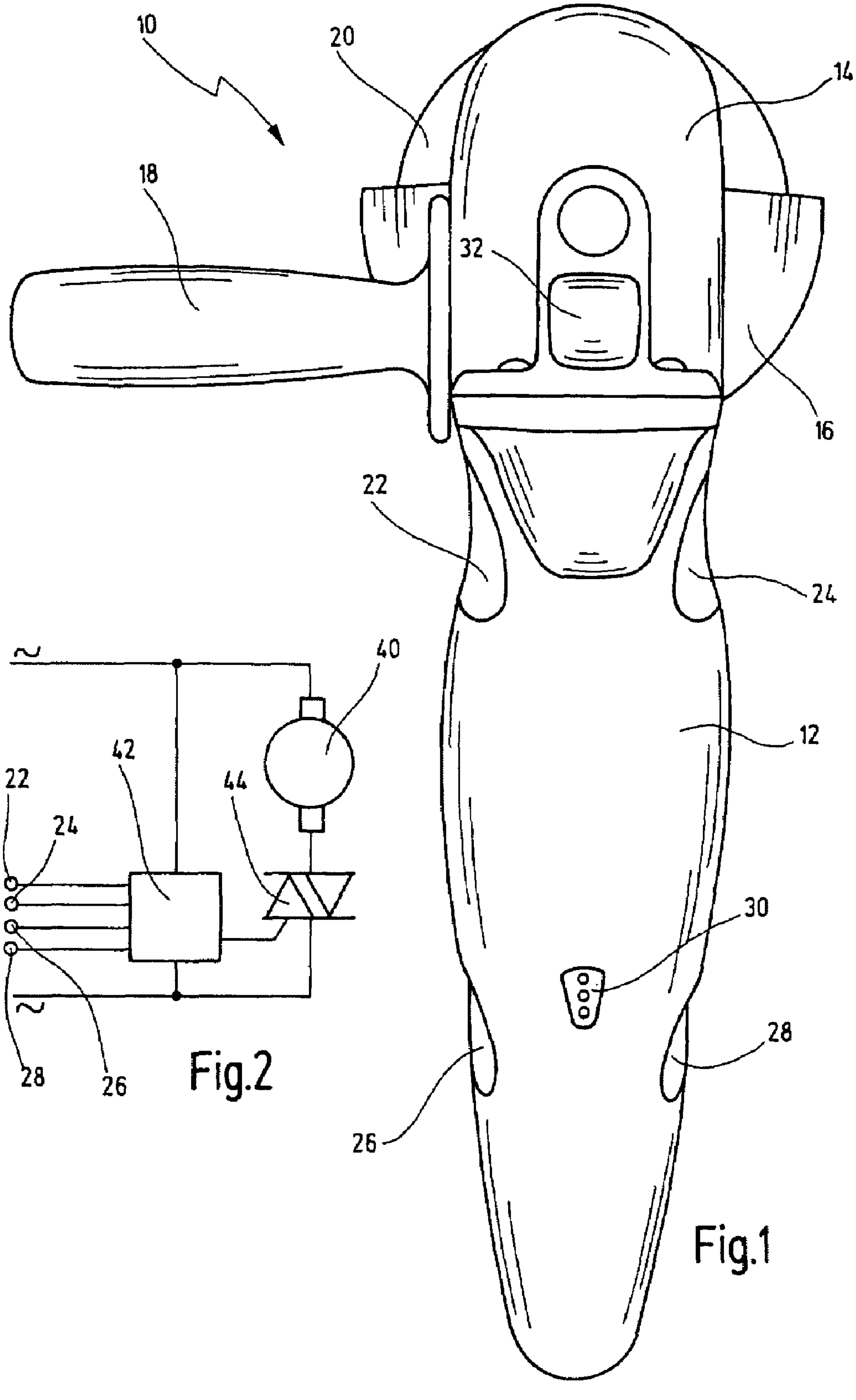
FIG. 1 shows a top view of a power tool according to the invention, in the form of an angle grinder.
FIG. 2 shows a simplified circuit diagram of a power tool according to FIG. 1.

FIG. 1 shows a power tool according to the invention in the form of an angle grinder indicated generally by reference numeral 10.

The power tool 10 comprises an elongated, nearly bar-shaped housing 12 with a gear head 14 provided on its one end and a protective cover 16 received on its underside. The outer end of the drive shaft, which projects from the gear head 14, carries a holder intended to receive a tool 20 in the form of a grinding wheel or a cutting-off disk. A straight handle 18 may be screwed to the gear head 14 on its right or its left side, as can be seen in FIG. 1.

The housing 12, which is symmetrical relative to its longitudinal axis, has an area directly adjoining the gear head 14 which is narrower on both sides in order to provide a grasping area where the housing 12 can be gripped easily with one hand and can be easily held between the thumb on the one side and the other fingers on the other side. In the narrower area of the housing 12 adjoining the gear head 14 there are provided, on the left and on the right sides of the housing, two elastic touch areas, namely a first elastic touch area 22 on the left side of the housing and a second elastic touch area 24 on the right side of the housing. Another narrower portion is provided on both sides of the housing on the end portion opposite the gear head 14 (approximately the outer third of the housing 12). Further touch areas are provided on the narrower portion on the left side of the housing and on the right side of the housing, namely a third touch area 26 on the left side and a fourth touch area 28 on the right side.

The touch areas 22, 24, 26, 28 serve to activate corresponding switching elements.

A simplified block diagram of the power tool 10 is shown in FIG. 2.

An electric motor 40 in the form of a universal motor is connected to a voltage source, in the present case to a system voltage of 230 V AC at 50 Hz, via a power control element 44, for example a thyristor. The power control element 44 or the thyristor is activated by a control means 42, preferably a microprocessor control.

The touch areas 22, 24, 26, 28 serve to activate suitable switching elements connected with the control means 42 (FIG. 2 shows only the touch areas 22 to 28, not the switching elements activated by them).

Now, the control means 42 is designed so as to impart to the motor 40 three operating modes, namely an inoperative mode in which the power control element 44 is completely blocked, a working mode in which the power control element 44 is periodically activated to achieve at least continuous rotation of the motor shaft, with simultaneous speed control being also possible in this case, and an intermediate mode whose function will be explained in detail further below.

In order to prevent unwanted starting of the motor 40 the arrangement in the present case is such that at least one of the front touch areas 22, 24 and at least one of the rear touch areas 26, 28 and, thus, the corresponding switching elements, are activated simultaneously. If only one of the touch areas 22, 24, 26, 28 is activated, a mode which may be brought about by the hand grasping the tool, then the power tool 10 is initially transferred to the intermediate mode.

In the intermediate mode, the motor 40 receives periodic voltage pulses each of which causes a short start of the motor shaft. By way of example, the thyristor 44 may be driven by each pulse for a period of 3 ms which in the case of a system frequency of 50 Hz and full-wave control corresponds to a phase angle of $\alpha=60°$ during one half-wave. Thereafter, complete blocking for 200 ms or for a longer interval of, for example, 500 ms may occur before the motor 40 is actuated again. As a result, the motor shaft will start shortly, followed by a standstill period, which would be followed again by a starting interval, etc. One thus obtains an intermediate mode that can be paraphrased also as "tuckering". While no operation is possible in that intermediate mode, the short-time periodic starting of the motor shaft and of the tool 20 driven by it, followed by the standstill period, signals to the user of the power tool both optically and acoustically, and also perceivably, that the power tool is in its intermediate mode. Now, if one or the other touch areas is activated simultaneously, for example if the second hand activates additionally one of the rear touch areas 26, 28 when the two front touch areas 22, 24 are already grasped, the power tool 10 will be transferred from its intermediate mode to its working mode in which the motor 40 is driven continuously. If, however, no further activation of any other touch area occurs and the grip on the housing 12 is released, the power tool 10 will automatically assume its inoperative mode.

Once the power tool 10 is in its working mode it will be sufficient to continue to activate one of the touch areas 22, 24, 26, 28 to maintain the working mode.

Although the power control element 44 causes the alternating voltage to be periodically blocked or partially blocked also in the working mode, such blocking in the working mode is only intended to control the speed of the electric motor 40. As a rule, only part of the full wave is cut off for this purpose in both the positive and the negative region. All in all, however, the electric motor 40 is continuously driven during successive voltage waves to ensure continuous operation of the motor 40. In contrast, in the intermediate mode the electric motor 40 is driven only over part of a half-wave, which mode is again followed by complete blocking over a plurality of wavelengths.

Regardless of whether one of the front touch areas 22, 24 or one of the rear touch areas 26, 28 is activated first, any first activation of a touch area will always initiate the intermediate mode. For transferring the tool to its working mode, one of the other touch areas must then be activated additionally. If, for example, one of the front touch areas 22, 24 is activated first, at least one of the rear touch areas 26, 28 needs to be activated in order to transfer the tool to its working mode. If, conversely, at least one of the rear touch areas 26, 28 is activated first, then one of the front touch areas 22, 24 needs to be activated subsequently or simultaneously in order to transfer the tool to its working mode. If one of the front touch areas 22, 24 and one of the rear touch areas 26, 28 are activated simultaneously, then the power tool will assume its working mode directly, and the motor 40 will start running. In this case, no “tuckering” will occur.

The power tool 10 is additionally provided with an external speed controller which serves to adjust the nominal speed of the electric motor 40 in its working mode. This is achieved by actuating, with the motor 40 running (in its working mode), a touch area 32 on the gear head and, simultaneously, one of the touch areas 22, 26 on the left side of the housing and one of the touch areas 24, 28. Activation of one of the touch areas 22, 26 on the left side of the housing will reduce the speed, while activation of one of the touch areas 24, 28 on the right side of the housing will increase the speed. By releasing the touch area 32, the current speed value will be stored. The stored nominal speed value will be maintained even after stoppage and subsequent re-starting of the electric motor 40. It can be rendered visible by an indication element 30 which may be provided with three LEDs, for example.

It is understood that apart from the “tuckering” phenomenon described in connection with the illustrated embodiment, any other signaling means may be used for signaling to the user that the tool is in its intermediate mode. This effect can be achieved for example by operation of a buzzer, activation of an optical display, or the like.

Still, the described tuckering motion of the motor in its intermediate mode is especially well suited for signaling to the user, both optically and acoustically, that the tool is in its intermediate mode, which mode is rendered perceivable additionally and simultaneously by the motion impulses from the motor.

What is claimed is:

1. A power tool comprising
- a motor for driving a tool;
- at least one switching element;
- a controller coupled with said at least one switching element for activating said motor, the controller controlling said motor so as to allow an activation of said motor for driving the tool only when said at least one switching element is activated several times in a predetermined way;
- wherein said controller is configured for generating at least three operating modes of said motor, a first inoperative mode, in which said motor is out of operation, a second working mode in which said motor is driven for driving a tool, and a third intermediate mode, in which further activation of a switching element is needed for transferring said motor into said working mode;
- said controller being configured for supplying periodic voltage pulses of a certain duration and a certain repetition frequency to said motor, when being in said intermediate mode, said duration and repetition frequency being selected so as to effect a periodic power-on and power-off of said motor, each power-on followed by an idle time and each idle time followed by a power-on of said motor;
- each power-on and each idle time within said intermediate mode being long enough to be perceived by a user of the power tool;
- said periodic power-on and power-off of said motor effecting a repetitive sequence of short movements of said power tool, without any manipulation of any switching element, for the duration that said motor is in said intermediate mode for signaling to the user that said power tool is within said intermediate mode.

2. The power tool of claim 1, further comprising a signal generator being activated when said power tool is within said intermediate mode for signaling said intermediate mode to the user.

3. The power tool of claim 2, wherein said signal generator comprises an acoustic signaling means.

4. The power tool of claim 2, wherein said signal generator comprises an optical signaling means.

5. The power tool of claim 1, wherein said controller is configured for transferring said motor into said working mode when said at least one switching element is actuated at least two times within a predetermined timeframe.

6. The power tool of claim 1, wherein said controller is configured for automatically transferring said motor into said inoperative mode, when a certain time has elapsed after having entered said intermediate mode without any action for transition into said working mode.

7. The power tool claim 1, wherein said at least one switching element is configured as a pushbutton.

8. The power tool of claim 1, wherein said at least one switching element is configured as an optical switch that can be activated by means of an elastic touch area.

9. The power tool of claim 1, wherein said at least one switching element is configured as a micro switch that can be activated by means of an elastic touch area.

10. A power tool comprising
- a motor for driving a tool;

at least two switching elements;

a controller coupled with said at least one switching element for activating said motor, the controller controlling said motor so as to allow an activation of said motor for driving the tool only when said at least two switching elements are activated simultaneously;

wherein said controller is configured for generating at least three operating modes of said motor, a first inoperative mode, in which said motor is out of operation, a second working mode in which said motor is driven for driving a tool, and a third intermediate mode, in which further activation of a switching element is needed for transferring said motor into said working mode;

said controller being configured for supplying periodic voltage pulses of a certain duration and a certain repetition frequency to said motor, when being in said intermediate mode, said duration and repetition frequency being selected so as to effect a periodic power-on and power-off of said motor, each power-on followed by an idle time and each idle time followed by a power-on of said motor;

each power-on and each idle time within said intermediate mode being long enough to be perceived by a user of the power tool;

said periodic power-on and power-off of said motor effecting a repetitive sequence of short movements of said power tool, without any manipulation of any switching element, for the duration that said motor is in said intermediate mode for acoustically and optically signaling to the user that said power tool is within said intermediate mode.

11. The power tool of claim 10, further comprising a signal generator being activated when said power tool is within said intermediate mode for signaling said intermediate mode to the user.

12. The power tool of claim 11, wherein said signal generator comprises an acoustic signaling means.

13. The power tool of claim 11, wherein said signal generator comprises an optical signaling means.

14. The power tool of claim 10, wherein said controller is configured for automatically transferring said motor into said inoperative mode, when a certain time has elapsed after having entered said intermediate mode without any action for transition into said working mode.

15. The power tool claim 10, wherein said at least two switching elements are configured as pushbuttons.

16. The power tool of claim 10, wherein said at least two switching elements are configured as optical switches that can be activated by means of elastic touch areas.

17. The power tool of claim 10, wherein said at least two switching elements are configured as micro switches that can be activated by means of elastic touch areas.

18. The power tool of claim 10, wherein said at least two switching elements are arranged for activation by grasping a housing of said power tool.

19. The power tool of claim 10, wherein said controller is configured such that activation of two of said switching elements in short succession will directly transfer the motor from an inoperative mode into said working mode.

20. A power tool comprising a motor for driving a tool;

at least two switching elements;

a controller coupled with said at least one switching element for activating said motor, the controller controlling said motor so as to allow an activation of said motor for driving the tool only when said at least two switching elements are activated in a predetermined way in succession;

wherein said controller is configured for generating at least three operating modes of said motor, a first inoperative mode, in which said motor is out of operation, a second working mode in which said motor is driven for driving a tool, and a third intermediate mode, in which further activation of a switching element is needed for transferring said motor into said working mode;

said controller being configured for supplying periodic voltage pulses of a certain duration and a certain repetition frequency to said motor, when being in said intermediate mode, said duration and repetition frequency being selected so as to effect a periodic power-on and power-off of said motor, each power-on followed by an idle time and each idle time followed by a power-on of said motor;

each power-on and each idle time within said intermediate mode being long enough to be perceived by a user of the power tool;

the sequence of periodic power-on and power-off of said motor effecting a repetitive sequence of short movements of said power tool, without any manipulation of any switching element, for the duration that said motor is in said intermediate mode for acoustically and optically signaling to the user that said power tool is within said intermediate mode.

21. The power tool of claim 20, further comprising a signal generator being activated when said power tool is within said intermediate mode for signaling said intermediate mode to the user.

22. The power tool of claim 21, wherein said signal generator comprises an acoustic signaling means.

23. The power tool of claim 21, wherein said signal generator comprises an optical signaling means.

24. The power tool of claim 20, wherein said controller is configured for automatically transferring said motor into said inoperative mode, when a certain time has elapsed after having entered said intermediate mode without any action for transition into said working mode.

25. The power tool claim 20, wherein said at least two switching elements are configured as pushbuttons.

26. The power tool of claim 20, wherein said at least two switching elements are configured as optical switches that can be activated by means of elastic touch areas.

27. The power tool of claim 20, wherein said at least two switching elements are configured as micro switches that can be activated by means of elastic touch areas.

28. The power tool of claim 20, wherein said at least two switching elements are arranged for activation by grasping a housing of said power tool.

29. The power tool of claim 20, wherein said controller is configured such that activation of two of said switching elements in short succession will directly transfer the motor from an inoperative mode into said working mode.

* * * * *